June 8, 1937.　　　H. W. JONKHOFF　　　2,083,166
BOGIE VEHICLE STEERING MECHANISM
Filed July 10, 1935　　　2 Sheets-Sheet 1
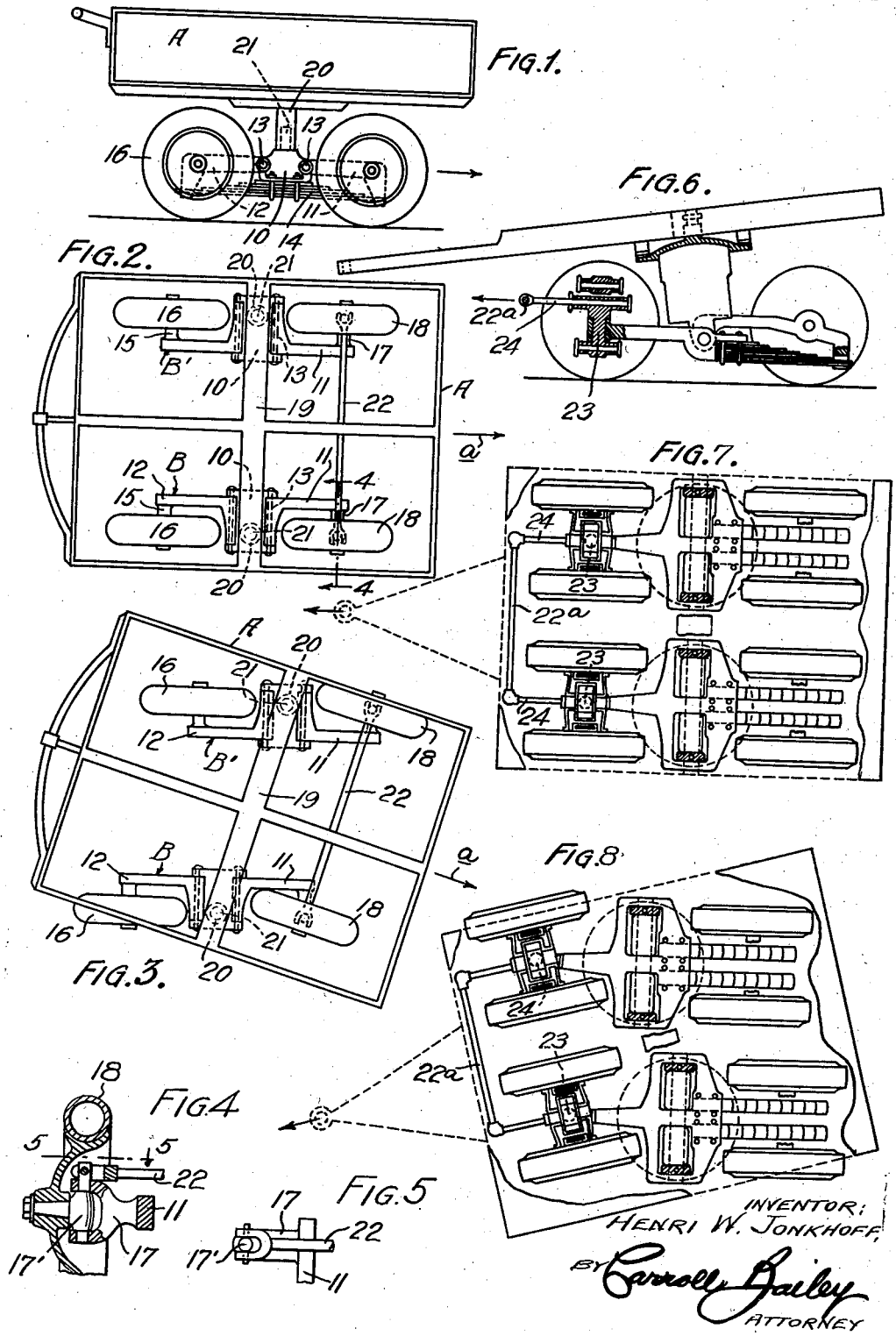

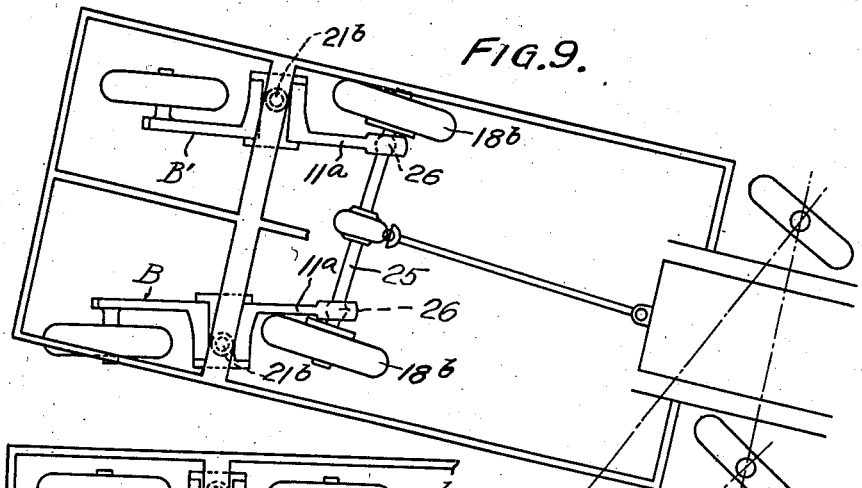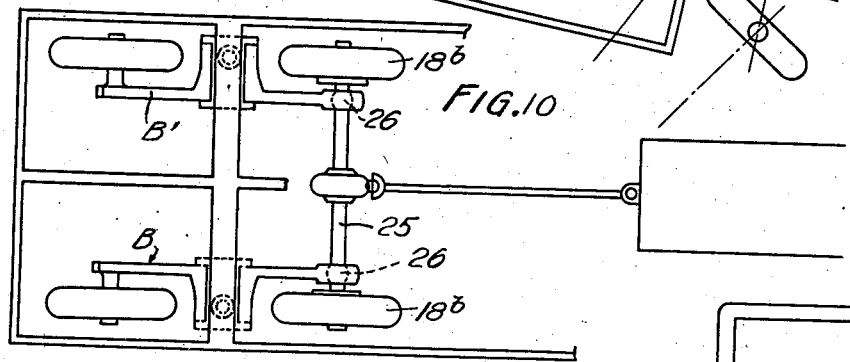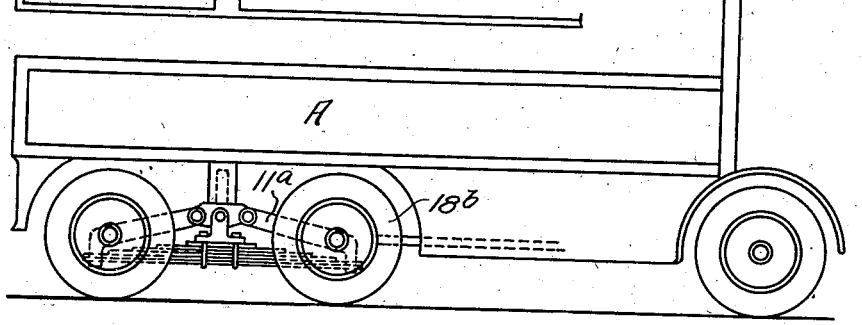

Patented June 8, 1937

2,083,166

UNITED STATES PATENT OFFICE 2,083,166

BOGIE VEHICLE STEERING MECHANISM

Henri Wouter Jonkhoff, Dusseldorf, Germany

Application July 10, 1935, Serial No. 30,677
In Germany February 11, 1935

1 Claim. (Cl. 280—33.5)

This invention relates to bogies, and has particular reference to improvements in bogie steering means.

In my prior Patent No. 2,015,310, there is described and claimed an arrangement whereby the steering wheels of a bogie may have steering movements imparted thereto in response to deviation of a bogie supported body or chassis from movement in a straight line.

The patented bogie steering arrangement referred to is characterized by connections between the bogie steering wheels and a cross bar which may be held against movement relative to the bogie supported body or chassis to cause the bogie steering wheels to have steering movements imparted thereto responsive to deviation of the body or chassis from straight line movement. When held against movement relative to the bogie supported body or chassis, said cross bar comprises, to all intents and purposes, a fixed part of the body or chassis. Thus, as regards producing steering movements of the steering wheels of the bogie responsive to deviation of the body or chassis from movement in a straight line, the connections between the steering wheels and said cross bar may be regarded as connections between said steering wheels and the actual body or chassis. In any event, as long as the body or chassis remains horizontal or, in other words, is not tipped or inclined relative to the bogie, the steering arrangement operates very satisfactorily. In fact, it operates very satisfactorily even though the body or chassis is tilted within certain limits. However, beyond a certain limit of tilting of the body or chassis the steering arrangement may not operate satisfactorily, while to make it operate satisfactorily under tilting of the body or chassis beyond said limit involves complications.

Accordingly, the general object of the present invention is to provide a bogie steering arrangement according to which steering movements of the bogie steering wheels are produced in response to deviation of the bogie supported body or chassis from movement in a straight line, and which is not affected by tilting movements of the bogie supported body or chassis relative to the bogie.

Another object of the invention is to provide a simplified arrangement whereby steering movements are imparted to the steering wheels of a bogie responsive to deviation of the bogie supported body or chassis from movement in a straight line.

With the foregoing and other objects in view, which will become more fully apparent as the nature of the invention is better understood, the same consists in the novel combination and arrangement of features as will be hereinafter more fully described, illustrated in the accompanying drawings and defined in the appended claim.

In the drawings:—

Figures 1 and 2 are a side elevation and a top plan view, respectively, of a hand truck equipped with two two-wheeled bogies arranged in side to side relationship and including means whereby the steering wheels of the bogies are steered responsive to changes in the direction of movement of the truck body and whereby the truck body may tilt relative to the bogies without affecting the steering action of the steering wheels thereof.

Figure 3 is a top plan view of the truck shown in Figs. 1 and 2 illustrating the positions assumed by the bogie wheels when the truck body deviates from straight line forward movement.

Figure 4 is a detail section on the line 4—4 of Fig. 2.

Figure 5 is a detail section on the line 5—5 of Fig. 4.

Figures 6 and 7 are a longitudinal section and a top plan view, respectively, illustrating another embodiment of the invention.

Figure 8 is a top plan view of the truck shown in Figs. 4 and 5 illustrating the positions assumed by the bogie wheels when the truck body deviates from straight line forward movement.

Figures 9 and 10 are a side elevation and a top plan view, respectively, illustrating another embodiment of the invention; and Figure 11 is a top plan view of the Figs. 7 and 8 embodiment of the invention illustrating the positions assumed by the bogie wheels when the truck body deviates from straight line forward movement.

Referring to the drawings in detail, first with particular reference to the embodiment of the invention illustrated in Figs. 1 to 5, A designates, generally, the body or chassis of a hand truck, trailer or the like, and B, B' designate, generally and respectively, right and left hand bogies supporting said body or chassis A. By the term "right hand" bogie is meant the bogie at the right hand side of the truck as regards forward movement thereof represented by the arrow $a$, and by the term "left hand" bogie is meant the bogie at the opposite side of the truck.

As shown, the bogies are right and left hand duplicates of each other. Therefore, a detailed description of one will suffice for both. Accordingly, selecting either bogie for purposes of reference, it will be observed that the same comprises a casting 10 from which extends, forwardly and rearwardly, respectively, a pair of arms 11 and 12 which, at their rear and front ends, respectively, have horizontal pivotal connections 13 with said casting so that they may swing vertically.

Suitably fastened intermediate its ends to the casting 10 at the under side thereof is a laminate leaf spring 14 which extends from said casting forwardly and rearwardly beneath the arms 11 and 12 and at its ends is suitably connected with said arms whereby the latter are yieldably restrained against swinging movements.

Rigid with and extending laterally outward from the arm 12 near the outer or free end thereof is a stub axle 15 on which is mounted the bogie rear wheel 16, while extending laterally outward from the arm 11 near the outer or free end thereof is a fork 17 in which is pivoted for horizontal swinging movement a knuckle 17' on which is mounted the bogie front or steering wheel 18.

For convenience in illustrating the invention the bottom of the body A is shown as being comprised simply by a cross bar 19 located approximately midway between the ends of said body. The bottom of said body may, however, be completely closed. Alternatively, the cross bar 12 may be separate from the body A and fastened thereto in any suitable manner. In any event, the said cross bar may be regarded to all intents and purposes as the bottom of the body A.

Suitably fastened to and depending from the bottom 19 of the body A near the sides thereof, respectively, is a pair of bearing elements 20, 20 which rest upon the castings 10, 10 of the respective bogies B, B' and thereby support the body A on said bogies. By means of a pin 21 extending upwardly from each casting 10 into the related bearing element 20, or by any other suitable means, each of the bogies B, B' is pivoted to the body A for rotation in a substantially horizontal plane relative thereto.

The axes of the pivot pins 21 or their equivalents are disposed in a common vertical plane extending transversely of the body A at right angles to the longitudinal axis thereof. Moreover, the knuckles 17', 17' of the respective bogies B, B' are connected together by a rod 22 which prevents rotation of said knuckles relative to each other and thereby maintains the front or steering wheels 18, 18 of the respective bogies always parallel to each other. Preferably the rod 22 has horizontal pivotal connections at its ends with the knuckles 17', 17' so as to permit free relative vertical movements between the wheels 18, 18 as, for example, when the truck is being moved over uneven surfaces.

Normally the wheels of the two bogies B, B' are disposed parallel to one another and parallel to the longitudinal axis of the truck body A with the centers of the wheels of each bogie disposed in the same vertical, longitudinal plane as the bogie pivot 21. If the truck is pushed or pulled straight ahead as indicated by the arrow $a$ the tendency of the wheels is to maintain their parallel relationship or to seek a parallel relationship if they are not parallel. This is true because of the maintenance of a parallel relationship between the front steering wheels 18, 18 of the respective bogies by the rod 22, and because straight line, forward or rearward movement of the truck is least resisted by the wheels when they are parallel. In other words, the wheels have natural tendencies to seek positions in which their axes of rotation are at right angles to the longitudinal axis of the body A during straight line movement of said body.

If it is assumed that the body A is being moved straight ahead and that during such movement a force is imposed on said body to cause it to deviate from its straight line movement, to the right for example, as illustrated in Fig. 3, the natural tendency of the bogie wheels to continue their straight line forward movement will result in clockwise rotation of the body A about the pivot 21 of each bogie. This, in turn, will result in advance of the left hand bogie B' relative to the right hand bogie B, and since the rod 22, the knuckles 17, the arms 11, 11 and the pivotal connections of the castings 10, 10 with the bottom 19 of the body A comprise a parallelogram structure, the rear wheels 16, 16 will be maintained parallel to each other as will also the front wheels, but the latter wheels will be rotated clockwise with their knuckles 17, 17. Consequently, the wheels will assume positions as illustrated in Fig. 3 in which their axes of rotation are as nearly as possible radial to the center about which the body A is swung. If, now, the body A is continued straight ahead from the position to which it was deviated from its original straight ahead direction of travel, the reverse of the actions just recounted will occur and the wheels will return to their positions parallel to each other and to the longitudinal axis of the body A.

In Figs. 6 to 8 of the drawings is illustrated an embodiment of the invention which is essentially the same as the embodiment of the invention illustrated in Figs. 1 to 5, except that the bogies B, B' are each of the four wheeled construction fully described in my prior Patent No. 2,015,311, dated September 24, 1935. As illustrated in said patent and in present Figs. 6 to 8, the front pair of wheels of each bogie are capable of steering rotation about a pivot 23 from which extends forwardly a steering arm 24. In accordance with the present invention the arms 24 of the respective bogies simply are connected together by a rod 22ª corresponding to the rod 22 of the Figs. 1 to 5 embodiment of the invention. Thus, except that the bogies B, B' of Figs. 6 to 8 are of the construction described in my prior Patent No. 2,015,311, the invention is the same as set forth in connection with Figs. 1 to 5.

In Figs. 9 to 11 of the drawings is illustrated an embodiment of the invention which is essentially the same as the embodiment thereof illustrated in Figs. 1 to 5 and which differs from said Figs. 1 to 5 embodiment only in that the front steering wheels 18ᵇ, 18ᵇ of the respective bogies B, B', instead of being mounted on knuckles pivoted to the arms 11ª, 11ª, are mounted on axles journaled in an axle casing 25 in accordance with conventional automotive practice, and said axle casing is mounted on the arms 11ª, 11ª by universal joints designated as 26, 26. The axle casing 25 thus corresponds to the rod 22 of the Figs. 1 to 5 embodiment of the invention. Moreover, mounting of the steering wheels 18ᵇ, 18ᵇ on axles journaled in the axle casing 25 affords an opportunity for driving said wheels in accordance with conventional practice as illustrated in said Figs. 9 to 11.

It will be noted regarding the Figs. 9 to 11 embodiment of the invention that the universal joints 26 are disposed inwardly of the pivotal connections 21b, 21b of the bogies with the body A and that, therefore, instead of there being formed a parallelogram structure as in Figs. 1 to 5, a trapezoid is formed. This merely produces the result, as compared with the Figs. 1 to 5 embodiment of the invention, that for any given deviation of the body A from straight line movement the amount of steering pivotal movement of the wheels 18b, 18b is smaller than that of the wheels 18, 18 of Fig. 1. This may be advantageous in certain instances and disadvantageous in other instances. If it is disadvantageous it may be remedied simply by moving the bogie pivots 21b, 21b inwardly.

The main point respecting each of the forms of the invention is that steering connections between the bogie steering wheels and the truck or other vehicle body or chassis are avoided. Therefore, the body or chassis may be tilted without affecting the operability of the bogie steering means which is responsive to deviation of the body or chassis from straight line movement.

Without further description it is thought that the features and advantages of the invention will be readily apparent to those skilled in the art, and it will of course be understood that changes in the form, proportion and minor details of construction may be resorted to, without departing from the spirit of the invention and scope of the appended claim.

I claim:—

In a vehicle including a body and a pair of laterally spaced supporting bogies therefor, and wherein each bogie comprises a member on which the vehicle body rests and a pair of arms pivoted at their inner ends to said member for vertical swinging movements and extending forwardly and rearwardly from said member, respectively, and wherein a front bogie wheel is carried by the forwardly extending arm of each bogie and a rear bogie wheel is supported by the rearwardly extending arm of each bogie, and wherein spring means resists upward swinging movements of said bogie arms, whereby the vehicle body is supported on said bogies for forward and rearward tilting movements; means whereby deviation of the vehicle body from movement in a straight line produces steering movements of a related pair of the wheels of the respective bogies relative to the vehicle body and also relative to the related bogie arms, said means comprising a vertical pivotal connection between the vehicle body and the member of each bogie on which the vehicle body rests, a rigid member extending between a related pair of the bogie arms and having a related pair of the wheels of the respective bogies mounted thereon and held thereby at all times in parallel relationship, and universal joint connections between said rigid member and said bogie arms at points spaced outwardly from the pivots of said arms cooperating with the pivotal connections between the vehicle body and the bogies to maintain the bogies at all times parallel to each other.

HENRI WOUTER JONKHOFF.